United States Patent

Kroner et al.

[11] Patent Number: 5,710,327
[45] Date of Patent: Jan. 20, 1998

[54] PREPARATION OF MODIFIED POLYASPARTIC ACIDS

[75] Inventors: Matthias Kroner, Eisenberg; Gunnar Schornick, Neuleiningen, both of Germany

[73] Assignee: BASF Aktiengesellschaft, Ludwigshafen, Germany

[21] Appl. No.: 809,296

[22] PCT Filed: Sep. 14, 1995

[86] PCT No.: PCT/EP95/03621

§ 371 Date: Mar. 27, 1997

§ 102(e) Date: Mar. 27, 1997

[87] PCT Pub. No.: WO96/10050

PCT Pub. Date: Apr. 4, 1996

[30] Foreign Application Priority Data

Sep. 27, 1994 [DE] Germany ............... 44 34 463.5

[51] Int. Cl.$^6$ ................................................. C07D 229/00
[52] U.S. Cl. ............................................ 562/565; 528/328
[58] Field of Search ................................. 562/565; 528/328

[56] References Cited

U.S. PATENT DOCUMENTS

| 5,408,028 | 4/1995 | Wood | 528/328 |
| 5,478,919 | 12/1995 | Koshan | 528/363 |
| 5,548,036 | 8/1996 | Kroner | 525/419 |
| 5,574,113 | 11/1996 | Kroner | 525/327.6 |
| 5,639,723 | 6/1997 | Kroner | 510/476 |

FOREIGN PATENT DOCUMENTS

WO94/01486  1/1994  WIPO.

*Primary Examiner*—Michael L. Shippen
*Attorney, Agent, or Firm*—Oblon, Spivak, McClelland, Maier & Neustadt, P.C.

[57] ABSTRACT

Modified polyaspartic acids are prepared by condensing aspartic acid with polybasic carboxylic acids or anhydrides of polybasic carboxylic acids and ammonia without a diluent at temperatures of at least 140° C. in the absence of inorganic acids.

3 Claims, No Drawings

PREPARATION OF MODIFIED POLYASPARTIC ACIDS

BACKGROUND OF THE INVENTION

1. Field of the Invention

The invention relates to a process for preparing modified polyaspartic acids by condensing aspartic acid with cocondensable compounds without diluent at temperatures of at least 140° C. and, where appropriate, hydrolyzing the condensates with alkali metal and/or alkaline earth metal bases in aqueous medium.

2. Discussion of the Background

WO-A-94/011486 discloses modified polyaspartic acids obtainable by polycondensation of 1–99.9 mol% aspartic acid with 99–0.1 mol% cocondensable compounds. Examples of suitable cocondensable compounds are fatty acids, polybasic carboxylic acids, anhydrides of polybasic carboxylic acids, alcohols, amines, alkoxylated alcohols and alkoxylated amines. The condensation is preferably carried out in the presence of phosphoric acid as catalyst. Salts of aspartic acid and salts of polybasic carboxylic acids or fatty acids can, according to the statements in this reference, be cocondensed only if inorganic acids are additionally used in the cocondensation. The acids have to be removed from the condensates after the polycondensation.

SUMMARY OF THE INVENTION PREFERRED EMBODIMENTS

It is an object of the present invention to provide a process for preparing modified polyaspartic acids in which the condensation takes place in the absence of inorganic acids.

We have found that this object is achieved by a process for preparing modified polyaspartic acids by condensing aspartic acid with cocondensable compounds without diluent at temperatures of at least 140° C. and, where appropriate, hydrolyzing the condensates with alkali metal and/or alkaline earth metal bases in aqueous medium, employing as cocondensable compounds a) polybasic carboxylic acids or anhydrides of polybasic carboxylic acids and b) ammonia and carrying out the condensation in the absence of inorganic acids.

L-, DL- or D-aspartic acid can be employed as aspartic acid. The aspartic acid may contain water. The particle size of the aspartic acid crystals has no effect on the polycondensation.

Suitable group (a) cocondensable compounds are polybasic carboxylic acids or anhydrides of polybasic carboxylic acids.

Examples of polybasic carboxylic acids are oxalic acid, adipic acid, fumaric acid, maleic acid, itaconic acid, aconitic acid, succinic acid, malonic acid, suberic acid, azelaic acid, pyridinedicarboxylic acid, furandicarboxylic acid, phthalic acid, terephthalic acid, diglycolic acid, glutaric acid, substituted $C_4$-dicarboxylic acids, for example mercaptosuccinic acid, sulfosuccinic acid, $C_1$–$C_{26}$-alkylsuccinic acids (eg. octylsuccinic acid or dodecylsuccinic acid), $C_2$–$C_{26}$-alkenylsuccinic acids (eg. octenylsuccinic acid or dodecenylsuccinic acid), 1,2,3-propanetricarboxylic acid, 1,1,3,3-propanetetracarboxylic acid, 1,1,2,2-ethanetetracarboxylic acid, 1,2,3,4-butanetetracarboxylic acid, 1,2,2,3-propanetetracarboxylic acid, 1,3,3,5-pentanetetracarboxylic acid, 1,2,4-benzenetricarboxylic acid and 1,2,4,5-benzenetetracarboxylic acid.

Where the abovementioned polybasic carboxylic acids are able to form anhydrides, these can also be employed as component (a) in the preparation of the polycocondensates, eg. succinic anhydride, the dianhydride of butanetetracarboxylic acid, phthalic anhydride, acetylcitric anhydride, maleic anhydride, itaconic anhydride and aconitic anhydride.

The compounds of component (a) which are preferably used are citric acid, maleic anhydride and maleic acid. Citric acid is very particularly preferably employed. 0.01–2, preferably 0.1–1.1, mol of polybasic carboxylic acids or their anhydrides are used per mole of aspartic acid.

Ammonia is employed as component (b). Ammonia can be used in gaseous form or in the form of an aqueous solution. 0.01–2, preferably 0.1–1.1, mol of ammonia are employed for 1 mol of aspartic acid.

The reaction components can be mixed before the condensation or else under the condensation conditions. In order to achieve maximally homogeneous mixing of the reactants before the start of the condensation, it is possible, for example, to dissolve aspartic acid and polybasic carboxylic acids in water and add the required amount of ammonia in gaseous form or as aqueous solution. The temperatures of the aqueous solution can be up to 100° C. Either solutions or suspensions of solids in water are obtained, depending on the amount of water employed. For the condensation of the mixtures prepared in this way, the water is removed by distillation. The distillation can be carried out, for example, under reduced pressure or under atmospheric pressure, advantageously while passing through a stream of nitrogen. The remaining powdered residue is then heated with mixing, eg. stirring or kneading, to the reaction temperature. The condensation takes place above 140° C. The condensation rate and conversion increase with the temperature. The polycondensation is normally carried out at a temperature in the range of about 160 to 240, preferably 160° to 200° C. The polycondensation temperature essentially depends on the stability of the polybasic carboxylic acids or their anhydrides. For example, when citric acid is heated to above 200° C. there is marked decomposition of the citric acid with discoloration. The condensation of aspartic acid with citric acid and ammonia is therefore preferably carried out at below 200° C., eg. in the range from 160° to 180° C. By contrast, butanetetracarboxylic acid and terephthalic acid are very thermally stable.

When these polybasic carboxylic acids are employed, the condensation can also be carried out at distinctly above 200° C., eg. 210 to 240° C.

Aspartic acid is condensed with the cocondensable compounds of groups (a) and (b) without diluent and in the absence of inorganic acids. The condensation can be carried out under atmospheric pressure or else under reduced pressure. The condensations result in melts which are viscous, pasty or solidified to foams. The viscosity of the melts increases with the degree of conversion. Either solid reaction products or liquid or viscous condensates are obtained. Tacky condensates may also be produced. The polycondensation can be carried out, for example, in stirred vessels, kneaders, extruders, mixers or mills.

Examples of amounts employed per mole of aspartic acid in the polycondensation are a) 0.01–2 mol of at least one polybasic carboxylic acid and b) 0.01–2 mol of ammonia.

It is particularly preferred to prepare condensates employing citric acid as component a) with the molar ratio of aspartic acid to citric acid to ammonia being 1:1:1.

The molecular weights $M_w$ of the modified aspartic acids obtainable in this way are 500–10,000, preferably 600–4,000.

The modified polyaspartic acids obtainable in this way are used, for example, as additive for phosphate-free or reduced phosphate detergents and cleaners, as scale inhibitor or as dispersant for pigments. Reduced phosphate detergents and cleaners contain no more than 25% by weight of phosphate calculated as sodium triphosphate. The amounts of modified polyaspartic acids in the detergent and cleaner mixtures are, for example, 0.1–15% by weight.

EXAMPLE 210 g (1 mol) of citric acid monohydrate are dissolved in 400 g of water in a reactor which has a capacity of 2 1 and is equipped with an anchor agitator, and 133 g (1 mol) of aspartic acid and 68 g (1 mol) of 25% strength aqueous ammonia solution are added. The reaction mixture is heated to 100° C., and the aqueous solution is evaporated to dryness under water pump vacuum. The temperature of the residue is then increased to 120° C., at which it has the consistency of a viscous melt. The temperature of the reaction mixture is increased to 160° C. while stirring continuously. The polycondensation is then carried out at 160° C. for 2 hours. The viscosity of the melt increases during the polycondensation to such an extent that the stirrer has to be switched off. After the polycondensation is complete, the viscous melt is allowed to cool and the solidified mass is crushed at 20° C. to a powder. Suspension of the powder in water and addition of aqueous sodium hydroxide solution result in an aqueous solution of the sodium salt of a modified polyaspartic acid. The molecular weight $M_w$ of the polycondensate is 1,500.

We claim:

1. A process for preparing modified polyaspartic acids, which comprises cocondensing aspartic acid with (a) polybasic carboxylic acids or anhydrides of polybasic carboxylic acids and (b) ammonia without diluent at temperatures of at least 140° C. in the absence of inorganic acids, and hydrolyzing the cocondensates with alkali metal and/or alkaline earth metal bases in aqueous medium.

2. A process as claimed in claim 1, wherein a) 0.01–2 tool of at least one polybasic carboxylic acid and b) 0.01–2 mol of ammonia are employed per mole of aspartic acid.

3. A process as claimed in claim 1, wherein citric acid is employed as component (a), and the aspartic acid: citric acid: ammonia molar ratio is 1:1:1.

* * * * *